United States Patent Office 2,801,208
Patented July 30, 1957

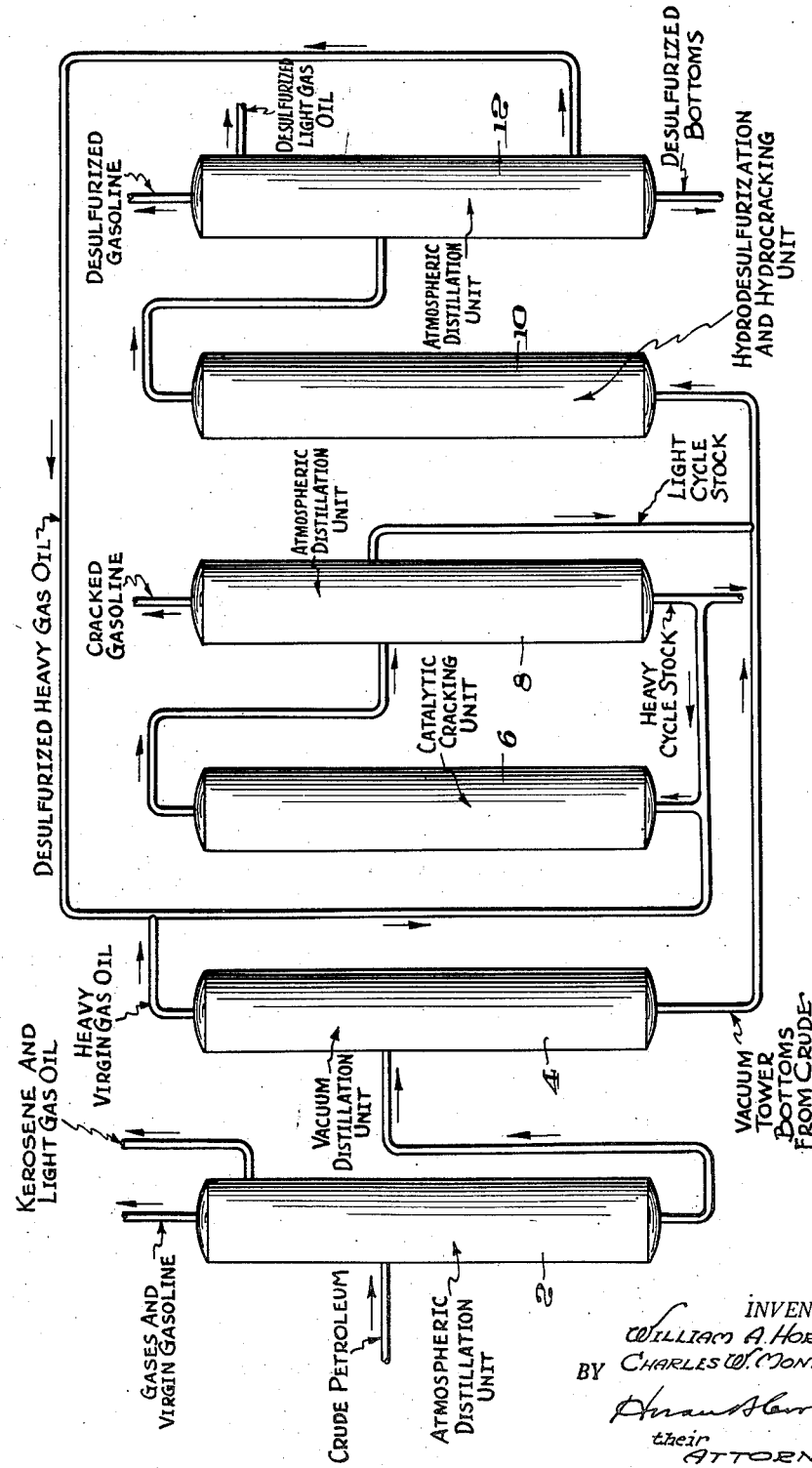

2,801,208

PROCESS FOR HYDROGEN TREATMENT OF HYDROCARBONS

William A. Horne and Charles W. Montgomery, Oakmont, Pa., assignors to Gulf Research & Development Company, Pittsburgh, Pa., a corporation of Delaware Application February 4, 1954, Serial No. 408,128

7 Claims. (Cl. 196—53)

This invention relates to improved procedure for converting a crude petroleum which contains sulfur into products having higher value.

The utilization of crudes which contain substantial amounts of sulfur gives rise to many problems. The cost of any desuufurization process applied to such a crude, or portions thereof, must be balanced against the value of the products produced. The desulfurization of whole crude has been heretofore proposed. However, the value of the desulfurized products thus produced does not in many cases justify the cost of the large capacity high pressure equipment necessary for such complete desulfurization. It is also known to fractionate the crude and to desulfurize certain of the fractions individually. This mode of operation necessitates discarding or uneconomical use of the low grade residual portions which are not ordinarily desulfurized.

This invention has for its object to provide improved procedure for treating a sulfur containing crude whereby the overall utilization of the components of the crude is improved. Another object is to provide an efficient and economical process for utilizing a sulfur containing crude wherein the heavier portions of the crude are efficiently desulfurized. Another object is to provide improved procedure and an improved catalyst for desulfurizing and hydrocracking particular portions of the crude. Another object is to improve the state of the art.

These and other objects are accomplished by our invention which in its broader aspects includes fractionation of the crude petroleum which contains sulfur to separate a bottoms portion representing between about 10 percent and 50 percent of the original crude. This bottoms portion is subjected to hydrodesulfurization by contacting with hydrogen at a temperature between about 775° and 880° F. at a pressure between about 200 and 2,000 p. s. i. g. while in the presence of a hydrogenation catalyst. The catalyst is regenerated when sufficient coke has been deposited to necessitate regeneration. Under these conditions a high yield of good quality catalytic cracking stock and other desulfurized products are obtained in the most economical manner.

Our invention also includes certain specific modifications of the foregoing, i. e., fractionation of the crude petroleum is conducted so as to separate a virgin gas-oil fraction (boiling point between about 670°–1030° F.) and a bottoms portion representing between about 10 and 50 percent of the crude. The virgin gas-oil fraction is catalytically cracked and the products therefrom distilled to obtain a cycle stock or furnace oil boiling between about 400° F. and 670° F. At least part of this cycle stock (preferably all) and the first mentioned bottoms portion are combined and subjected to hydrodesulfurization by contacting with hydrogen at a temperature between about 775° and 880° F. at a pressure between about 200 and 2,000 p. s. i. g. while in the presence of a hydrogenation catalyst. When required, the catalyst is regenerated by combustion and is re-used in the process.

Our invention also includes carrying out any of the foregoing operations in the presence of a nickel oxide-tungsten oxide catalyst and/or under optimum or intermediate severity conditions as will be explained in more detail hereinafter.

In the following examples and description, we have set forth several of the preferred embodiments of our invention but it is to be understood that they are given by way of illustration and not in limitation thereof.

Our invention in all of its forms involves hydrodesulfurization-hydrocracking of a 10–50 percent bottoms either alone or mixed with another hydrocarbon. Therefore the combined hydrodesulfurization and hydrocracking step will first be discussed in detail since it is common to all of the modifications of our invention. This step can be accomplished by means of any hydrogenation catalyst such as metals, oxides and sulfides of groups VI and VIII metal elements of the periodic table for instance molybdenum sulfide or oxide, nickel, nickel oxide, tungsten oxide, etc., or mixtures of these metals, oxides and sulfides. We have found that a nickel oxide-tungsten oxide catalyst is unusually effective in this particular application in that it gives both a high degree of desulfurization and a high degree of hydrocracking resulting in high yields of lower boiling products of greater value, such as gasoline, fuel oil, etc. This catalyst also has an unexpectedly long life under the repeated regenerations encountered in the process of our invention. The catalyst is preferably deposited on a carrier such as alumina, activated alumina, silica-alumina (such as a cracking catalyst), alumina stabilized with small amounts of silica, etc. Activated alumina stabilized with a small amount of silica is especially effective when employed in combination with the nickel oxide-tungsten oxide catalyst since it results in further increase in activity and improved life. Approximately 1 to 4 percent silica content is preferred. However the nickel oxide-tungsten oxide catalyst has superior activity and life when used on other carriers.

These catalysts are prepared in known manner. In preparing the preferred nickel oxide-tungsten oxide catalyst it is recommended that the method disclosed in copending application Serial No. 222,521, filed April 23, 1951, McKinley and Pardee (now Patent No. 2,703,789, March 8, 1955), be used. This application describes preparing an ammonium tungstate solution, adding a nickel nitrate solution thereto and mixing the two solutions in proportions calculated to give the desired ratio of oxides. The impregnated carrier is then drained and calcined in the usual manner to convert the impregnant into nickel oxide-tungsten oxide. While we prefer to employ this method of deposition or impregnation since it gives deposition of the oxides in predetermined ratios, other known methods for preparing mixed oxide catalysts may be used. The use of a nickel oxide-tungsten oxide catalyst containing between about 0.1:1.0 and 2.0:1.0 mol ratio of nickel oxide to tungsten oxide gives maximum rate of hydrogenation and a product having minimum specific gravity and carbon residue, in addition to high desulfurization and hydrocracking. Therefore, we prefer to employ a catalyst within this composition range.

The combined hydrodesulfurization-hydrocracking operation may be carried out using a fixed bed of catalyst in which case the catalyst would be pelleted, or like form, and held in the reactor by supports in known manner. On the other hand, the catalyst may be in powdered form and used in a fluidized condition. In such event, it would be desirable to avoid introducing the liquid portion of the charged hydrocarbon onto the catalyst at a faster rate than it is hydrocracked off the catalyst, otherwise the catalyst particles will become wetted and agglomerated and fluidization will be harmfully affected. Our preferred mode of operation is to introduce the hydrocarbon charge into a reactor containing a fixed bed of catalyst so that the liquid portion can flow downwardly over the catalyst. This downflowing liquid is effectively hydrocracked and desulfurized and at the same time, the unconverted portion of the liquid tends to wash the catalyst and, at least partially, helps in keeping the catalyst free of deposits.

Eventually coke or carbon is deposited on the catalyst in sufficient amount to cause a decrease in activity and necessitate regeneration. The length of time operation may continue before regeneration is necessary will depend upon the temperature employed, the nature of the charge and the pressure, i. e., lowering the pressure increases coke deposition, as does increasing the temperature. Before the coke deposit reaches about twenty percent by weight of the catalyst, the onstream period should be terminated and the catalyst regenerated. We have found that a throughput of between about 1.0 and 24 volumes of charge per volume of catalyst may be used. A throughput of about 2 to 6 is generally most satisfactory. However, this varies depending upon other conditions such as the specific space velocity, temperature and pressure used.

When the catalyst has acquired a deposit of coke which is large enough to require regeneration, the onstream portion of the operation is terminated and the catalyst is regenerated by combustion to burn-off the coke deposits. In general, a temperature of about 1000°–1200° F. should be used during this combustion. It is desirable to maintain the temperature during regeneration as low as possible to avoid harmfully affecting the catalyst. However, we have found that our catalyst is very resistant to loss of activity even after many regenerations in the presence of steam. It is preferable to utilize two or more reactors and switch the charge to a second reactor during regeneration of the contaminated catalyst.

The pressure is maintained between about 200 and 2,000 p. s. i. g. The lower pressures increase the amount of carbon deposition, whereas the higher pressures in this range decrease carbon deposition and increase the amount of hydrogen consumption. However, since the higher pressures require more expensive equipment and involve considerable operating problems, we prefer to operate at as low a pressure as possible, such as between about 200 and 1,000 p. s. i. g. The hydrogen is introduced into the reactor under the pressure selected in a ratio of between about 500 and 20,000 cubic feet of hydrogen per barrel of reduced crude. A liquid space velocity of between about 0.3 and 2.0 (vol. of oil per hour per vol. of cat.) is generally employed.

We have found that the combined hydrodesulfurization-hydrocracking operation and the overall economy of the process can be improved by fractionating the crude to obtain a heavy gas-oil fraction (distillation range about 670°–1030° F.) and an undistilled residue (which with most crudes will vary between about 10 and 50 percent of the crude, i. e., the larger value will be used with lower A. P. I. gravity crudes and the lower value with higher gravity crudes). This gas-oil fraction is then subjected to catalytic cracking and the products distilled to obtain a catalytic gas-oil ordinarily known as light cycle stock boiling between about 400° F. and 670° F. This catalytic cracking is carried out in known manner and does not constitute a part of our invention. This light cycle stock is then combined with the 10 to 50 percent bottoms and the mixture hydrodesulfurized and hydrocracked. It has been found that the sulfur in the catalytic charge stock tends to concentrate in the light cycle stock so that it is not a satisfactory furnace oil. However, it is desulfurized without substantial cracking into lower boiling products during the desulfurization-hydrocracking operation.

It is advantageous, but not necessary, to pre-fractionate the sulfur containing crude in a two step fractionating operation, the first fractionation being at atmospheric pressure. In this first distillation, a distillate is removed comprising the lighter portions, including light gas-oil. The bottoms from this distillation is then distilled in a vacuum tower to give a distillate having a corrected end point of about 1030° F. This distillate which is a cracking charge stock comprising heavy gas-oil (distillation range about 670°–1030°) is removed and a bottoms portion is separated constituting components boiling above 1030° F. The heavy gas-oil from the vacuum still is catalytically cracked as mentioned and the products from the catalytic cracking operation are fractionated and the light cycle stock separated.

We have also found that it is advantageous to fractionate the hydrodesulfurized product to separate a heavy gas-oil fraction boiling at about 670°–1030° F. and to subject this fraction to catalytic cracking either with the virgin gas-oil fraction or in a separate cracking operation.

In the accompanying drawing we have illustrated diagrammatically one of the preferred embodiments of our invention. Referring to the drawing, numeral 2 designates an atmospheric distillation unit, numeral 4 a vacuum distillation unit, numeral 6 a catalytic cracking unit, numeral 8 an atmospheric distillation unit, numeral 10 a hydrodesulfurization and hydrocracking unit, and numeral 12 an atmospheric distillation unit. In carrying out the process of our invention the crude petroleum to be treated is introduced into atmospheric distillation unit 2 and distilled therein to remove products boiling below about 670° F. as overhead or sidestreams. These overhead or sidestream products would include virgin gasoline, kerosene, light gas-oil, etc. The bottoms from unit 2 boiling above about 670° F. are withdrawn and introduced into vacuum distillation unit 4 which is at a pressure between about 10 and 50 mm. and in which an inert carrier gas such as steam may be used to assist the distillation. The overhead obtained in vacuum distillation unit 4 is a virgin heavy gas-oil having a boiling range of between about 670°–1030° F. (corrected to atmospheric pressure). The bottoms fraction from vacuum distillation unit 4 comprises about 10 to 50 percent of the original crude charged to atmospheric tower 2. This bottoms is removed and is treated in a manner to be described below.

The virgin heavy gas-oil overhead from tower 4 is preferably combined with desulfurized heavy gas-oil from atmospheric distillation unit 12 and is subjected to a catalytic cracking operation in unit 6. The products from catalytic cracking unit 6 then are distilled in atmospheric distillation unit 8, and the catalytically cracked materials of low boiling point such as light and heavy gasoline, are taken overhead. A light cycle stock or No. 2 fuel oil fraction is obtained as a sidestream and heavy cycle stock as bottoms from atmospheric distillation unit 8. This heavy cycle stock is returned as feed to the catalytic cracking unit or partly withdrawn as indicated in the drawing.

The light cycle stock from distillation unit 8 is combined with the 10 to 50 percent bottoms from vacuum distillation unit 4, and the mixture is hydrodesulfurized and hydrocracked in unit 10. The hydrodesulfurized-hydrocracked product is then distilled in distillation unit 12 at atmospheric pressure. Desulfurized products such as gasoline, light gas-oil, etc., are removed as overhead and a desulfurized heavy gas-oil is removed from a lower section of the distillation unit. This desulfurized heavy gas-oil is combined with the heavy virgin gas-oil and catalytically cracked in unit 6 or removed and blended into No. 6 fuel oil. Desulfurized bottoms are removed from the base of tower or distillation unit 12.

We have found that there are definite economic advantages in utilizing conditions of intermediate severity during the combined hydrodesulfurizing and hydrocracking operation. This is illustrated by the following data which were obtained by combined hydrodesulfurization-hydrocracking of a 10.7° API blend containing 71.2 percent Kuwait vacuum tower bottoms (17 vol. percent of crude) (5.8° API) and 28.8 percent catalytically cracked furnace oil (22.7° API) under severe, medium and mild conditions. The conditions of operation in these tests are given in Tables I and II while the analysis and yields of the products obtained are given in Tables III, IV and V. Cost analysis of these results shows that a refinery operating on the intermediate severity basis will have a pay-out period of approximately 5.5 years less than the mild and 1.5 years less than the severe conditions. The catalyst used in these tests was nickel oxide-tungsten oxide deposited on activated alumina stabilized with silica. This catalyst contained 3% nickel (present as oxide) and 9% tungsten (present as oxide).

TABLE I

| Case | Operating Conditions * | Product Gravity, °API |
|---|---|---|
| I (severe) | 0.5 S. V., 4 hours | 32.5–32.8 |
| II (medium) | 1 S. V., 4 hrs. or 0.5 S. V., 16 hrs | 24.3–25.2 |
| III (mild) | 1 S. V., 24 hrs | 19.0 |

* Approximate temperature 835° and pressure 1,000 p. s. i. g.

TABLE II

| Case No. | 17% Kuwait Bottoms | FCC Fuel Oil Dist. | 71.2–28.8% Blend | I Blend | II Blend | III Blend |
|---|---|---|---|---|---|---|
| Charge | 17% Kuwait Bottoms | FCC Fuel Oil Dist. | 71.2–28.8% Blend | Blend | Blend | Blend |
| Run Conditions: | | | | | | |
| Operation | | | | Downflow | Downflow | Downflow |
| H₂ Feed: MSCF/B | | | | 20 | 16 | 9 |
| Reactor Temperature— | | | | | | |
| Temperature: °F. (Avg.) | | | | 836 | 836 | 833 |
| Inlet Temp., °F. (Avg.) | | | | 815 | 814 | 812 |
| Maximum Temp., °F | | | | 860 | 858 | 863 |
| Temp. Gradient, °F | | | | 53 | 44 | 51 |
| Pressure: P. s. i. g | | | | 1,000 | 1,000 | 1,000 |
| LHSV: V./V./Hr | | | | 0.47 | 0.52 | 1.08 |
| LTP: V./V | | | | 1.89 | 8.62 | 4.31 |
| Balance, Wt. Percent on Oil Charge: | | | | | | |
| Total Liquid | | | | 87.2 | 91.9 | 90.6 |
| Dry Gas | | | | 5.2 | 3.3 | 3.4 |
| Sulfur Eliminated | | | | 4.7 | 3.4 | 3.5 |
| Carbon | | | | 3.3 | 2.2 | 2.2 |
| Total | | | | 100.4 | 100.8 | 99.7 |
| Liquid Product: | | | | | | |
| Yield, Vol. Percent of Charge | | | | 100.9 | 101.3 | 99.3 |
| Inspection— | | | | | | |
| Gravity, °API | 5.8 | 22.7 | 10.7 | 32.5 | 25.2 | 24.3 |
| Viscosity, SUV | ² 10,346 | | ² 352 | | ³ 17 | |
| 100° F | | 39.1 | ³ 451 | 35.5 | 49.4 | 65.0 |
| Pour Point, °F., ASTM D 97 | above 115 | | +25 | | | |
| Color, ASTM Union | | 2.5 | | 4+ | 8+D | 8+D |
| Sulfur, Braun-Shell, Percent | 5.45 | 2.66 | 4.87 | 0.18 | 1.46 | 1.36 |
| Water and Sediment, Percent, ASTM D 96 | 0.4 | | 0.2 | | | |
| Carbon Residue, Conradson on 590° F. Bottoms, Percent, ASTM D 189 | 19.8 | 0.24 | ⁴ 15.2 | 0.38 | 9.33 | 9.00 |
| Bromine No | | 29.7 | | 11.2 | 19.7 | 17.9 |
| Olefins, Percent by Vol., ASTM D 875 | | 43.5 | | 15.2 | | |
| Aromatic Content, Percent by Vol., ASTM D 875 | | | | 37.3 | | |
| Distillation, ASTM D 158— | | | | | | |
| Over Point, °F | | 434 | 458 | 124 | 158 | 168 |
| 10% at, °F | | 497 | | 318 | 382 | 392 |
| 50% at, °F | | 552 | | 518 | | |
| Percent at 392° F ¹ | | 0 | 0 | 22 | 13 | 13 |
| Percent at 500° F | | 12 | 4 | 42 | 30 | 28 |
| Percent at 590° F | | 73 | 24 | 65 | 52 | 47 |
| Aniline Point, °F | | 98.4 | | | | |
| Hydrogen Consumption: | | | | | | |
| S. C. F./B | | | | 927 | 745 | |
| Wt. Percent of Charge ⁵ | | | | −1.4 | −1.2 | |

| III Blend |
|---|
| Blend |
| Downflow |
| 9 |
| 834 |
| 814 |
| 848 |
| 34 |
| 1,000 |
| 1.04 |
| 24.9 |
| 94.9 |
| 1.6 |
| 2.2 |
| 0.3 |
| 99.0 |
| 100.5 |
| 19.0 |
| 185 |
| 8+D |
| 2.72 |
| 17.66 |
| 24.2 |
| 174 |
| 439 |
| 8 |
| 18 |
| 36 |
| 430 |
| −0.7 |

¹ Corrected for loss.
² SUS at 210° F.
³ SFS at 122° F.
⁴ C. R. on total.
⁵ Minus sign indicates hydrogen was consumed.

TABLE III

Case I product

| Cut Range, °F. | Gases | Gasoline, C5-410 | Naphtha, 300-410 | Furnace Oil, 410-670 | Cracking Oil [1], 670-920 | Asphalt, 920+ |
|---|---|---|---|---|---|---|
| Percent by Vol. of Crude Product: | | | | | | |
| Start of Fraction | | 2.8 | 17.6 | 30.2 | 76.7 | 97.0 |
| End of Fraction | | 30.2 | 30.2 | 76.7 | 97.0 | 100.0 |
| Fraction | 2.8 | 27.4 | 12.6 | 46.5 | 20.3 | 3.0 |
| Inspection: | | | | | | |
| Gravity, °API | | 52.4 | 43.1 | 28.7 | 17.8 | [2]—3.5 |
| Viscosity, SUV, Sec. 210° F | | | | | 45 | 42,920 |
| Sulfur, percent | | [3] 0.143 | [3] 0.037 | [4] 0.29 | [4] 0.81 | [5] 2.54 |
| Carbon Residue, Conradson, ASTM D189 | | | | | 0.78 | 39.0 |
| ASTM Distillation | | D86 | D86 | D158 | Vac. | |
| Over Point, °F | | 145 | 320 | 423 | 405 | |
| End Point, °F | | 385 | 408 | 621 | | |
| 10% at, °F | | 213 | 331 | 462 | 718 | |
| 30% at, °F | | 247 | 340 | 487 | 740 | |
| 50% at, °F | | 297 | 347 | 510 | 774 | |
| 70% at, °F | | 327 | 356 | 540 | 819 | |
| 90% at, °F | | 361 | 371 | 583 | 892 | |
| Recovery, percent | | 99.5 | 99.4 | 99.5 | | |
| Residue, percent | | 0.5 | 0.5 | 0.5 | | |
| Characterization Factor | | 11.78 | 11.49 | 11.22 | 11.35 | |

[1] From flashing vaporization of 670° F. bottoms.
[2] Calculated.
[3] Lamp sulfur.
[4] Braun-Shell sulfur.
[5] Bomb sulfur.

TABLE IV

Case II product

| Cut Range, °F | Gases | Gasoline, IBP-410 | Naphtha, 300-410 | Furnace Oil, 410-670 | Cracking Oil [1] 670-940 | Cracking Oil [1] 670-1,030 | Asphalt 940+ | Asphalt 1,030+ |
|---|---|---|---|---|---|---|---|---|
| Percent by Vol. of Crude Product: | | | | | | | | |
| Start of Fraction | 0.0 | 0.2 | 8.5 | 16.4 | 58.8 | 58.8 | 83.9 | 90.6 |
| End of Fraction | 0.2 | 16.4 | 16.4 | 58.8 | 83.9 | 90.6 | 100.0 | 100.0 |
| Fraction | 0.2 | 16.2 | 7.9 | 42.4 | 25.1 | 31.8 | 16.1 | 9.4 |
| Inspection: | | | | | | | | |
| Gravity, °API | | 53.8 | 43.1 | 28.1 | 19.9 | 17.7 | [2] 2.5 | [2] —2.4 |
| Viscosity, SUV, Sec., 210° F | | | | | 47 | 55 | 5,290 | >1,500,000 |
| Sulfur, Percent | | [3] 0.207 | [3] 0.145 | [4] 0.96 | [4] 1.39 | [4] 1.55 | [5] 3.21 | [5] 3.70 |
| Carbon Residue Conradson, Percent, ASTM D187 | | | | 0.03 | 0.67 | 2.40 | 29.4 | 48.3 |
| ASTM Distillation | | D86 | D86 | D158 | Vac. | Vac. | | |
| Over Point, °F | | 126 | 330 | 458 | 374 | 525 | | |
| End Point, °F | | 384 | 398 | 634 | | | | |
| 10% at, °F | | 189 | 338 | 491 | 716 | 724 | | |
| 30% at, °F | | 262 | 346 | 514 | 754 | 770 | | |
| 50% at, °F | | 306 | 354 | 540 | 790 | 830 | | |
| 70% at, °F | | 324 | 362 | 573 | 843 | 912 | | |
| 90% at, °F | | 370 | 378 | 608 | 906 | 1,001 | | |
| Recovery, Percent | | 98.2 | 99.1 | 99.1 | | | | |
| Residue, Percent | | 0.7 | 0.9 | 0.7 | | | | |
| Characterization Factor | | 11.87 | 11.53 | 11.29 | 11.55 | 11.52 | | |

[1] From flash vaporization of 670° F. bottoms.
[2] Calculated.
[3] Lamp sulfur.
[4] Braun-Shell sulfur.
[5] Bomb sulfur.

TABLE V

Case III product

| Cut Range, °F. | Gases | Gasoline, IBP-410 | Naphtha, 300-410 | Furnace Oil, 410-670 | Cracking Oil [1] 670-940 | Cracking Oil [1] 670-1,030 F. | Asphalt 940+ | Asphalt 1,030+ |
|---|---|---|---|---|---|---|---|---|
| Percent by Vol. of Crude Product: | | | | | | | | |
| Start of Fraction | 0.0 | 0.2 | 3.2 | 9.0 | 45.9 | 45.9 | 59.1 | 69.0 |
| End of Fraction | 0.2 | 9.0 | 9.0 | 45.9 | 59.1 | 69.0 | 100.0 | 100.0 |
| Fraction | 0.2 | 8.8 | 5.8 | 36.9 | 13.2 | 23.1 | 40.9 | 31.0 |
| Inspection: | | | | | | | | |
| Gravity, °API | | 52.5 | 45.4 | 26.7 | 20.8 | 18.7 | 5.9 | [2] 3.0 |
| Viscosity, SUV, Sec., 210° F | | | | | 49 | 66 | 3,280 | 14,650 |
| Sulfur, Percent | | [3] 0.170 | [3] 0.190 | [4] 1.42 | [4] 1.85 | [4] 2.18 | [4] 4.07 | [5] 4.41 |
| Carbon Residue, Conradson, Percent, ASTM D189-46 | | | | | 0.58 | 2.01 | 23.2 | 29.0 |
| ASTM Distillation | | D86-46 | D86-46 | D158-41 | Vac. | Vac. | | |
| Over Point, °F | | 121 | 174 | 462 | 332 | 570 | | |
| End Point, °F | | 398 | 414 | 644 | | | | |
| 10% at, °F | | 192 | 291 | 506 | 746 | 774 | | |
| 30% at, °F | | 264 | 327 | 528 | 783 | 820 | | |
| 50% at, °F | | 313 | 345 | 554 | 811 | 898 | | |
| 70% at, °F | | 348 | 362 | 586 | 867 | 961 | | |
| 90% at, °F | | 377 | 382 | 622 | 939 | | | |
| Recovery, Percent | | 99.0 | 99.3 | 98.9 | | | | |
| Residue, Percent | | 0.8 | 0.0 | 0.9 | | | | |
| Characterization Factor | | 11.84 | 11.60 | 11.24 | 11.70 | 11.74 | | |

[1] From flash vaporization of 670° F. bottoms.
[2] Calculated.
[3] Lamp sulfur.
[4] Braun-Shell sulfur.
[5] Bomb sulfur.

The intermediate severity conditions are obtained by utilizing a space velocity of between about 0.5 and 1.0 and a throughput of between about 9 and 4 in the pressure and temperature ranges disclosed herein.

As indicated above we have found that a nickel oxide-tungsten oxide catalyst has definite advantages in the process of our invention. To demonstrate the superiority of this catalyst tests were run comparing it with typical catalysts such as cobalt molybdate, nickel, nickel oxide or tungsten oxide which are known to have high utility in closely related types of processes. The details on these tests are given in Examples 1 and 2.

EXAMPLE 1

The two catalysts used in this example were both deposited upon "H-42 alumina" which is an activated alumina manufactured by the Aluminum Company of America and containing about 4 percent of silica. Both catalysts contained 10 percent of the active hydrogenating component deposited upon the alumina carrier, the metals being present in a 1:1 mol ratio. Thus, in the case of nickel oxide-tungsten oxide, the two oxides were present in a 1:1 mol ratio and the total nickel and tungsten content based on the oxide was 10 percent.

A Kuwait crude was distilled to separate a lighter component constituting light gas-oil and lower boiling components. The bottoms from this atmospheric distillation was then subjected to distillation in the presence of steam under reduced pressure of about 30–50 mm. of mercury and a temperature of about 750° F. The overhead constituting heavy gas-oil boiling at 670°–1030° F. was subjected to fluid catalytic cracking. The product was fractionated and a light cycle oil (distillation range 400°–650°) was separated. This cycle oil was combined with the vacuum tower bottoms (boiling above 1030° F. and comprising 17 percent of the crude) in an amount such as to form a mixture of 71 percent vacuum tower bottoms and 29 percent cycle oil. This mixture was then hydrodesulfurized-hydrocracked in a fixed bed reactor, and in the presence of the catalysts described above. The operating conditions and the results are given in Table VI.

TABLE VI

|  | Charge: Kuwait V. T. Btms. 71% FCC Light Cycle Oil | Catalyst | |
|---|---|---|---|
|  |  | Cobalt Molybdate | Nickel Oxide-Tungsten Oxide |
| Operating Conditions: |  |  |  |
| Hydrogen Recycle, Cu. Ft./Bbl |  | 9,320 | 10,590 |
| Reactor Temperature, °F., Average |  | 831 | 833 |
| Reactor Pressure: P. s. i. g. |  | 1,000 | 1,000 |
| Space Velocity, Vol./Hr./Vol |  | 1.0 | 0.9 |
| Throughput, Vol./Vol |  | 4.0 | 3.8 |
| Balance, Percent by Wt. of Charge: |  |  |  |
| Total Liquid |  | 93.2 | 91.3 |
| Dry Gas |  | 2.8 | 4.0 |
| Sulfur Removed |  | 2.5 | 2.5 |
| Carbon on Catalyst |  | 1.7 | 2.5 |
| Total |  | 100.2 | 100.3 |
| Liquid Product: |  |  |  |
| Yield, Percent by Vol. of Charge |  | 100.0 | 99.0 |
| Inspection— |  |  |  |
| Gravity, °API | 10.2 | 20.4 | 22.1 |
| Viscosity, SUV, Sec., 100° F | ² 386 | 154 | 94.5 |
| Color, ASTM Union | 8+D | 8+D | 8+D |
| Sulfur, B-S, Percent | 4.83 | 2.38 | 2.34 |
| Distillation, ASTM D 158— |  |  |  |
| Over Point, °F | 458 | 186 |  |
| End Point, °F., Percent at: |  |  |  |
| 392° F.¹ | 0 | 13 | 23 |
| 500° F | 4 | 27 | 34 |
| 590° F | 24 | 43 | 46 |
| 10% at, °F | 536 | 356 | 224 |

¹ Corrected for loss.
² At 210° F.

It will be noted from this data that the nickel oxide-tungsten oxide catalyst exhibited considerably greater hydrocracking activity as shown by the gravity of the product and the desulfurizing activity was slightly greater than that of the cobalt molybdate. It is also to be noted that the nickel oxide-tungsten oxide catalyst gave a much greater yield of gasoline and a bottoms product having a much lower viscosity.

EXAMPLE 2

In this example three catalysts were tested, one containing nickel, another nickel oxide-tungsten oxide and the third tungsten oxide to compare their activity in regard to hydrodesulfurization and hydrocracking. Fifty percent atmospheric tower bottoms from a Kuwait crude and a 17 percent Kuwait vacuum tower bottoms were employed as charge stock in these tests. The three catalysts tested were deposited upon H-42 alumina having the composition described in Example 1. The amount of active component in each catalyst was substantially the same in each of the tests. The conditions and results of these tests are given in Tables VII, VIII and IX.

TABLE VII

| | Charge: 50% Kuwait Bottoms | Catalyst | | |
|---|---|---|---|---|
| | | 10% Ni on H-42 alumina | 12% NiW on H-42 alumina | 12% W on H-42 alumina |
| Operating Conditions: | | | | |
| Hydrogen Recycle, Cu. Ft./Bbl | | 10,325 | 10,251 | 10,566 |
| Reactor Temperature, °F.— | | | | |
| Average | | 827 | 832 | 831 |
| Outlet | | 840 | 855 | 846 |
| Reactor Pressure: P. s. i. g | | 1,000 | 1,000 | 1,000 |
| Space Velocity, Vol./Hr./Vol | | 1.00 | 0.98 | 0.96 |
| Throughput, Vol./Vol | | 3.98 | 3.90 | 3.84 |
| Balance, Percent by Wt. of Charge: | | | | |
| Total Liquid | | 92.6 | 93.3 | 91.1 |
| Dry Gas | | ca. 3.0 | 3.4 | 5.0 |
| Sulfur Removed | | 2.6 | 3.2 | 3.1 |
| Carbon | | 2.15 | 2.10 | 3.24 |
| Total | | 100.3 | 101.9 | 101.9 |
| Liquid Product: | | | | |
| Yield, Percent by Vol. of Charge | | 100.2 | 102.58 | 102.1 |
| Inspection— | | | | |
| Gravity, °API | 15.0 | 26.0 | 29.9 | 32.2 |
| Viscosity, SUV, Sec., 100° F | 6,320 | 76.65 | 51.8 | 39.9 |
| Color, ASTM Union | 8+D | 8+D | 8+D | 8+D |
| Sulfur, Braun-Shell, Percent | 4.13 | 1.68 | 1.05 | 1.18 |
| Water and Sediment, Percent ASTM D 96 | 0.5 | 0.55 | 0.25 | 0.8 |
| Carbon Residue, Conradson on 590° F. Bottoms, Percent ASTM D 189 | 10.95 | 4.76 | 4.78 | 3.42 |
| Bromine No.—ASTM D 1159 | | 16.9 | 12.0 | 13.0 |
| Distillation—ASTM D 158, Percent at: | | | | |
| 392° F.ᵃ | 0.0 | 13 | 22 | 25 |
| 500° F | | 19 | 32 | 36 |
| 590° F | 2.4 | 30 | 43 | 49 |
| 10 Percent at, °F | | 385 | 288 | 284 |

ᵃ Corrected for loss.

TABLE VIII

| | Charge: 50% Kuwait Bottoms | Catalyst | |
|---|---|---|---|
| | | 12% W on H-42 Alumina | 12% NiW on H-42 Alumina |
| Balance, Percent by Wt. of Charge: | | | |
| Total Liquid | | 92.8 | 93.3 |
| Dry Gas | | 5.0 | 3.4 |
| Sulfur Removed | | 2.4 | 3.1 |
| Carbon | | 2.41 | 2.10 |
| Total | | 102.6 | 101.9 |
| Liquid Product: | | | |
| Yield, Percent by Vol. of Charge | | 101.1 | 102.58 |
| Inspection— | | | |
| Gravity, °API | 15.0 | 28.4 | 29.9 |
| Viscosity, SUV, Sec., 100° F | 632.0 | 52.1 | 51.8 |
| Color, ASTM Union | 8+D | 8+D | 8+D |
| Sulfur, Braun-Shell, Percent | 4.13 | 1.77 | 1.05 |
| Water and Sediment, Percent, ASTM D 96 | 0.5 | 0.2 | 0.25 |
| Carbon Residue, Conradson on 590° F. Bottoms, Percent ASTM D 189 | 10.95 | 5.64 | 4.78 |
| Bromine No. ASTM D 1859 | | 16.7 | 12.0 |
| Distillation, ASTM D 158: | | | |
| Over Point, °F | 462 | | |
| Percent at 392° F.ᵃ | 0.0 | 21 | 22 |
| Percent at 500° F | 0.0 | 30 | 32 |
| Percent at 590° F | 2.4 | 41 | 43 |
| 10% at °F | | 278 | 288 |

ᵃ Corrected for loss.

TABLE IX

*Hydrodesulfurization of 17% Kuwait vacuum tower bottoms over nickel-tungsten and tungsten catalysts*

| Average of Cycles | Charge | 1-9, Inclusive | 11-13, Inclusive |
|---|---|---|---|
| Catalyst | 12% Nickel-Tungsten on H-42 | | |
| Operating Conditions: | | | |
| Average Temperature, °F | | 835 | 835 |
| Pressure: P. s. i. g | | 1,000 | 1,000 |
| Space Velocity, Vol./Hr./Vol | | 0.66 | 0.63 |
| Carbon Deposit, Percent by Wt. of Charge | | 5.08 | 5.32 |
| Liquid Product Inspection: | | | |
| Gravity, °API | 5.8 | 23.7 | 22.9 |
| Sulfur, Braun-Shell, Percent | 5.48 | 2.07 | 2.23 |

| Average of Cycles | Charge | 1-9, Inclusive | 11-13, Inclusive |
|---|---|---|---|
| Catalyst | 12% Tungsten on H-42 | | |
| Operating Conditions: | | | |
| Average Temperature, °F | | 834 | 839 |
| Pressure: P. s. i. g | | 1,000 | 1,000 |
| Space Velocity, Vol./Hr./Vol | | 0.64 | 0.63 |
| Carbon Deposit, Percent by Wt. of Charge | | 6.27 | 5.59 |
| Liquid Product Inspection: | | | |
| Gravity, °API | 5.8 | 25.5 | 22.3 |
| Sulfur, Braun-Shell, Percent | 5.48 | 2.22 | 2.89 |

Table VII shows the nickel oxide-tungsten oxide catalyst had greater desulfurizing activity than either the nickel or tungsten oxide separately. Also, it will be noted that the nickel oxide-tungsten oxide catalyst resulted in somewhat lower carbon deposition than either of the other catalysts. While the nickel oxide-tungsten oxide catalyst had considerably higher hydrocracking activity than nickel as shown as shown by the gravity of the product it was initially lower in this regard than tungsten oxide. However, this greater activity of tungsten oxide for hydrocracking is lost rather rapidly, while the activity of the nickel oxide-tungsten oxide catalyst is retained. This is illustrated in Table IX where thirteen cycles were carried out, each cycle involving an onstream period followed by regeneration under identical conditions. It will be seen that the nickel oxide-tungsten oxide catalyst continued to have very high desulfurization and hydrocracking activity; whereas, the tungsten oxide catalyst had dropped substantially below the nickel oxide-tungsten oxide catalyst both in desulfurizing and hydrocracking power. The data in Table IX, first column, were obtained by averaging the results of runs one through nine to obtain the activity of the catalyst during initial stages of its life and runs eleven through thirteen to obtain the activity of the catalyst after a longer period of use. It will also be noted that Table VIII shows that even in the initial cycles the tungsten oxide catalyst is inferior to the nickel oxide-tungsten oxide catalyst when compared on similar conversion levels. Thus, when both catalysts are used under conditions which give the same degree of conversion, the sulfur removed by the nickel oxide-tungsten oxide catalyst is substantially greater, the carbon deposition is considerably less, the total yield of product is higher and the gravity of the product is higher.

What we claim is:

1. The process of treating a crude petroleum which contains sulfur compounds to desulfurize and convert into catalytic cracking charge stock which comprises in combination subjecting the crude to distillation to separate a bottoms fraction constituting between about 10 and 50 percent of the crude, simultaneously desulfurizing and hydrocracking the 10 to 50 percent bottoms portion by contacting with hydrogen at a temperature between about 775° and 880° F., at a pressure between about 200 and 2000 p. s. i. g. while in the presence of a nickel oxide-tungsten oxide catalyst, said contacting taking place under conditions which result in a degree of conversion selected from the group consisting of medium conversion and mild conversion, said conditions being selected from space velocities between about 0.5 and 1 and a contact time of between about 4 hours and 24 hours.

2. The process for substantially converting an approximately 10 to 50 percent bottoms fraction of a crude petroleum into a catalytic cracking charge stock and for simultaneously desulfurizing said bottoms fraction which comprises contacting said bottoms fraction with hydrogen at a temperature between about 775° and 880° F., at a pressure between about 200 and 2000 p. s. i. g. while in the presence of a nickel oxide-tungsten oxide catalyst, said contacting taking place under conditions which result in substantial conversion into catalytic cracking charge stock, said conversion conditions being a space velocity between about 0.5 and 1 and a contact time of between about 4 hours and 16 hours, terminating the contacting, subjecting the catalyst upon which coke is deposited to combustion regeneration to remove coke therefrom and re-using the regenerated catalyst in said hydrogen treatment of said bottoms fraction.

3. The process of treating a crude petroleum which contains sulfur compounds which comprises in combination subjecting the crude to distillation to separate a gas-oil fraction boiling between about 670° and 1030° F. and a bottoms fraction constituting between about 10 and 50 percent of the crude, subjecting the gas-oil fraction to catalytic cracking, fractionating the products from the catalytic cracking operation to separate a cycle stock boiling between about 400° F. and 670° F., simultaneously desulfurizing and hydrocracking a mixture of the bottoms fraction and the cycle stock by contacting with hydrogen at a temperature between about 775° and 880° F., at a pressure between about 200 and 2000 p. s. i. g. while in the presence of a nickel oxide-tungsten oxide catalyst, said contacting taking place under conditions which result in substantial conversion into catalytic cracking charge stock, said conversion conditions being a space velocity between about 0.5 and 1 and a contact time between about 4 and 24 hours, continuing said operation until sufficient coke has been deposited on the catalyst to require regeneration, terminating the contacting, subjecting the catalyst upon which coke is deposited to combustion regeneration to remove coke therefrom and re-using the regenerated catalyst in the hydrogen treatment of additional mixture of bottoms fraction and cycle stock.

4. The process of treating a crude petroleum which contains sulfur compounds which comprises in combination subjecting the crude to distillation to separate a gas-oil fraction boiling between about 670° and 1030° F. and a bottoms fraction constituting between about 10 and 50 percent of the crude, subjecting the gas-oil fraction to catalytic cracking, fractionating the products from the catalytic cracking operation to separate a cycle stock boiling between about 400° F. and 670° F., simultaneously desulfurizing and hydrocracking a mixture of the bottoms fraction and the cycle stock by contacting with hydrogen at a temperature between about 775° and 880° F., at a pressure between about 200 and 2000 p. s. i. g., while in the presence of a nickel oxide-tungsten oxide catalyst, said contacting taking place under conditions which result in substantial conversion into catalytic cracking charge stock, said conversion conditions being a space velocity between about 0.5 and 1 and a contact time between about 4 and 16 hours, fractionating the hydrodesulfurized-hydrocracked product to separate a fraction boiling between about 670° and 1030° F., adding this fraction to the above-mentioned gas-oil prior to catalytic cracking, terminating the contacting, subjecting the catalyst upon which coke is deposited to combustion regeneration to remove coke therefrom and re-using the regenerated catalyst in the hydrogen treatment of additional mixture of bottoms fraction and cycle stock.

5. The process of treating a crude petroleum which contains sulfur compounds which comprises in combination subjecting the crude to distillation to separate a gas-oil fraction boiling between about 670° and 1030° F. and a bottoms fraction constituting between about 10 and 50 percent of the crude, subjecting the gas-oil fraction to catalytic cracking, fractionating the products from the catalytic cracking operation to separate a cycle stock boiling between about 400° F. and 670° F., simultaneously desulfurizing and hydrocracking a mixture of the bottoms fraction and the cycle stock by contacting with hydrogen at a temperature between about 775° and 880° F., at a pressure between about 200 and 2000 p. s. i. g. while in the presence of a nickel oxide-tungsten oxide catalyst which contains between 0.1:1.0 and 2.0:1.0 mol ratio of nickel oxide to tungsten oxide deposited upon alumina containing between 1 and 4 percent silica, said contacting taking place under conditions which result in substantial conversion into catalytic cracking charge stock, said conversion conditions being a space velocity between about 0.5 and 1 and a contact time between about 4 and 16 hours, continuing said operation until sufficient coke has been deposited on the catalyst to require regeneration, terminating the contacting, subjecting the catalyst upon which coke is deposited to combustion regeneration to remove coke therefrom, re-using the regenerated catalyst in the hydrogen treatment of additional mixture of bottoms fraction and cycle stock and repeating the contacting and regeneration steps.

6. A process for hydrocracking a residual oil having a low A. P. I. gravity and obtained by distillation of a crude oil to a gas oil product which process comprises contacting said residual oil with a catalyst consisting essentially of nickel oxide and tungsten oxide supported on a porous carrier at a temperature between about 775° and 875° F., at a pressure between about 200 and 2000 p. s. i. g. and in the presence of added hydrogen in the amount between about 500 and 20,000 S. C. F./B.

7. A process for hydrocracking a residual oil to a gas oil product, said residual oil containing a substantial amount of residual components and having a low gravity which process comprises contacting said residual oil with a catalyst consisting essentially of nickel oxide and tungsten oxide supported on alumina at a temperature between about 775° and 875° F., at a pressure between about 200 and 2000 p. s. i. g., at a space velocity between about 0.3 and 2 for a throughput of 4 to 24 and in the presence of added hydrogen in the amount between about 500 and 20,000 S. C. F./B.

References Cited in the file of this patent

UNITED STATES PATENTS

| | | |
|---|---|---|
| 2,258,111 | Engel | Oct. 7, 1941 |
| 2,366,490 | Cloud | Jan. 2, 1945 |
| 2,486,361 | Nahin et al. | Oct. 25, 1949 |
| 2,500,146 | Fleck et al. | Mar. 14, 1950 |
| 2,508,014 | Davidson | May 16, 1950 |
| 2,516,877 | Horne et al. | Aug. 1, 1950 |
| 2,548,015 | Goodson et al. | Apr. 10, 1951 |
| 2,559,285 | Douce | July 3, 1951 |
| 2,642,381 | Dickinson | June 16, 1953 |
| 2,700,014 | Anhorn et al. | Jan. 18, 1955 |
| 2,700,015 | Joyce | Jan. 18, 1955 |
| 2,703,789 | McKinley et al. | Mar. 8, 1955 |